United States Patent [19]

Smith et al.

[11] 4,119,593

[45] Oct. 10, 1978

[54] POLYEPOXIDE HIGH SOLIDS COATINGS

[75] Inventors: Oliver Wendell Smith, South Charleston; Joseph Victor Koleske, Charleston, both of W. Va.

[73] Assignee: Union Carbide Corporation, New York, N.Y.

[21] Appl. No.: 798,185

[22] Filed: May 18, 1977

[51] Int. Cl.² .................................................. C09D 3/58
[52] U.S. Cl. ............................... 260/18 EP; 528/118; 528/92; 528/361; 528/405; 528/408; 528/418; 526/56; 526/57
[58] Field of Search ............ 260/18 EP, 2 EC, 47 EC

[56] References Cited

U.S. PATENT DOCUMENTS

| | | | |
|---|---|---|---|
| 3,031,434 | 4/1962 | Radlove | 260/78.4 |
| 3,117,099 | 1/1964 | Proops et al. | 260/18 EP |
| 3,201,360 | 8/1965 | Proops et al. | 260/18 EP |
| 3,281,492 | 10/1966 | McGary, Jr. et al. | 260/830 TW |
| 3,336,251 | 8/1967 | Manasia et al. | 260/18 EP |
| 3,344,096 | 9/1967 | Manasia et al. | 260/18 EP |
| 3,362,922 | 1/1968 | Manasia et al. | 260/18 EP |
| 3,405,102 | 10/1968 | Kugler et al. | 260/78.4 |
| 3,432,465 | 3/1969 | De Acetis et al. | 260/47 EC |
| 3,437,517 | 4/1969 | Ellermon et al. | 260/29.2 EP |
| 3,449,274 | 6/1969 | Solensky | 260/18 EP |
| 3,505,358 | 4/1970 | Tinsley et al. | 260/18 EP |
| 3,506,598 | 4/1970 | Groff et al. | 260/2 EC |
| 3,507,819 | 4/1970 | Vegter et al. | 260/18 EP |
| 3,578,615 | 5/1971 | Moore et al. | 260/18 EP |
| 3,975,314 | 8/1976 | Smyk et al. | 260/2 EP |
| 3,975,456 | 8/1976 | Labana et al. | 260/830 TW |

*Primary Examiner*—Eugene C. Rzucidlo
*Attorney, Agent, or Firm*—Francis M. Fazio

[57] ABSTRACT

High solids, low energy cure coating compositions of aliphatic polyepoxides, monocarboxylic acid compounds as initiator and stannous salts as catalysts.

19 Claims, No Drawings

POLYEPOXIDE HIGH SOLIDS COATINGS

BACKGROUND OF THE INVENTION

Governmental regulations have placed ever increasing restrictions on the amounts and types of organic volatiles permitted to escape into the atmosphere from coatings compositions. Considerable efforts have been expended to develop coatings compositions having a minimal amount of volatile organic components; and this had led to development of powder coatings, radiation-curable coatings, water-borne coatings, and high solids coatings. In these recent developments, the amounts of organic solvents present are minimal; consequently, there is little or no atmospheric pollution.

In the field of solvent coatings, efforts have been made to reduce the amount of volatile solvent present and to increase the amount of reactive components that will react to produce the coatings on the substrate. At a sufficiently high concentration of such components, one has what is known as a high solids coating composition. These are compositions that are applied in liquid form and dry to acceptable films without the evaporation of substantial quantities of solvents. Thus, a high solids coating composition, such as the ones hereinafter described, which would serve to lower atmospheric pollution and still produce a good satisfactory coating composition, would be of great importance.

SUMMARY OF THE INVENTION

It has now been found that the use of certain hereinafter defined monofunctional carboxylic acid initiators and divalent organotin compounds initiate the homopolymerization of polyepoxides, particularly aliphatic epoxides and epoxidized fatty acids and fatty oils, to produce high solids compositions useful as inks and coatings that can be cured rapidly and efficiently and are considered low-energy curable. The compositions can optionally contain pigments, flow control agents, solvents, and other additives commonly used in coating and ink formulations. They are applied in a conventional manner and thermally cured to dry films.

DESCRIPTION OF THE INVENTION

The polyepoxide high solids coating compositions of this invention are cured to dry films at lower temperatures than have heretofore been possible. This, in today's energy crisis, is of distinct advantage since it results in the consumption of less fuel. The compositions comprise an aliphatic epoxide, preferably a cycloaliphatic polyepoxide, an initiator that is a monocarboxylic acid compound as hereinafter defined and a stannous acylate or stannous alkoxide as the catalyst. It was completely unexpected to find that the mixture of monocarboxylic acid compound and stannous salt would effectively crosslink the polyepoxides at the low temperatures found useful. In the past it has been the general practice of those skilled in the art to cure epoxides in the absence of catalysts using polycarboxylic acid as crosslinkers and temperatures of above 300° F. We have now discovered that our compositions cure rapidly and efficiently with the use of monocarboxylic acid initiators and stannous salts at significantly lower temperatures of from about room temperature to about 275° F. In most instances the compositions are cured by heating at from about 175° F. to 225° F. for periods of 20 minutes or less.

In an attempt to explain the sequence of reactions that does occur, it has been found that two steps seem to be involved, initiation and propagation. These are set forth in the following equations, which for simplicity employs a monoepoxide reactant. By the use of polyepoxides crosslinking occurs, as is known in the art.

Initiation

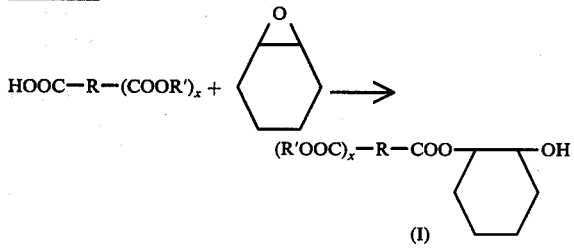

(I)

Propagation

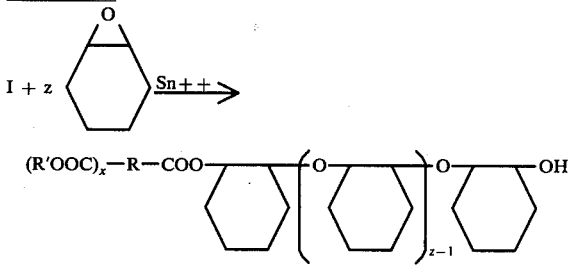

While applicants believe the reaction proceeds according to this theoretical sequence they do not intend to be strictly bound thereto. It is solely presented as an attempt to explain the reaction mechanisms believed to be involved.

The monocarboxylic acid compounds used as initiators are represented by the general formula:

HOOC—R—(COOR')$_x$ wherein $x$ is an integer having a value of from 0 to 2, preferably 0 or 1; R is an alkyl group having from 6 to 24 carbon atoms, preferably from 12 to 18 carbon atoms, when $x$ is 0 and from 1 to 12 carbon atoms, preferably from 2 to 6 carbon atoms, when $x$ is 1 or 2, a cycloalkyl group having 5 or 6 ring carbon atoms; a phenyl group, naphthyl group or —CH=CH— when $x$ is 1; R' is an alkyl group having from 1 to 8 carbon atoms, preferably 1 to 3 carbon atoms, a —C$_n$H$_{2n}$(OC$_n$H$_{2n}$)$_m$OC$_p$H$_{2p+1}$ group or a —C$_n$H$_{2n}$OOCCX=CH$_2$ group; $n$ is 2 to 4; preferably 2; $m$ is 0 to 10, preferably 2 to 7; $p$ is 1 to 15 and X is hydrogen or methyl. The monocarboxylic acid initiators can be unsubstituted or they can be substituted with any group which will not interfere with the reaction or have an undesirable effect on the finished coating. Illustrative of suitable substituents are the halogens, nitro, alkoxy, alkyl, keto and the like.

The most preferred initiators are those having a pK$_a$ value of less than 4. In addition, those that are liquid and readily miscible are more preferred than are the solid compounds which present problems of uniform distribution in the compositions.

Illustrative of suitable monocarboxylic acid initiators are the monocarboxylic acid compounds defined by the general formula when $x$ is 0. Typical thereof are caprylic acid, capric acid, hendacanoic acid, lauric acid, tridecanoic acid, pentadecanoic acid, stearic acid, arachidic acid, behenic acid, cerotic acid, 2-ethylhexoic acid, 9-methyl-decanoic acid, benzoic acid, naphthoic acid, and the like. When x is 1 or 2, the monocarboxylic acid compounds are the partial esters (having a free carboxyl group) of di- or tri-carboxylic acids or the anhydrides thereof. These partial esters are known to those skilled in the art, as are the methods by which they are produced. Illustrative thereof are the partial esters of the following acids: oxalic, malonic, succinic, glutaric, adipic, suberic, azelaic, sebacic, brassylic, maleic, fumaric, itaconic, phthalic, isophthalic, terephthalic, trimellitic, tartaric, 1,2-cyclo-hexanedicarboxylic acid, 1,4-cyclohexanedicarboxylic acid, tetrahydrophthalic, tetrachlorophthalic, 1,4,5,6,7,7-hexachloro-5-norbornene-2,3-dicarboxylic acid, and the like.

The polyepoxides that can be used in producing the high solids compositions of this invention are well known to those skilled in the art and are fully described in U.S. Pat. No. 3,027,357, U.S. Pat. No. 2,890,194, U.S. Pat. No. 2,890,197, U.S. Pat. No. 3,117,099, U.S. Pat. No. 3,031,434, U.S. Pat. No. 3,125,592 and U.S. Pat. No. 3,201,360. Of particular interest in that portion of U.S. Pat. No. 3,027,357 beginning at column 4, line 11 to column 7, line 38 and that portion of U.S. Pat. No. 3,201,360 beginning at column 2, line 60 through line 43 of column 4, which portion and disclosure is specifically incorporated herein by reference. Among some of the specific illustrative polyepoxides disclosed therein one can mention, 3,4-epoxycyclohexylmethyl-3,4-epoxycyclohexane carboxylate, bis(3,4-epoxycyclohexylmethyl)adipate, vinyl cyclohexane dioxide, bis(2,3-epoxycyclopentyl)ether, epoxidized linseed oil, epoxidized soybean oil, methyl epoxy linseedate, butyl epoxy soyate, octyl epoxy linseedate, epoxidized polymers and copolymers of butadiene, polyglycidyl ethers of polyhydric phenols, and the like.

The stannous salt catalysts are either the stannous acylates or stannous alkoxides. These can be substituted with hydroxyl, halogen, keto, or other groups which do not deleteriously affect the reaction.

The stannous acylates which are used as catalysts in this invention are the divalent tin salts of mono- and dicarboxylic acids which contain from 1 to 54 carbon atoms. The acids can be saturated such as acetic acid, 2-ethylhexanoic acid, ethyl acid phthalate, etc., or they may be unsaturated acids such as oleic acid, linoleic acid, eleostearic acid, ricinoleic acid, and the like. Illustrative of suitable stannous acylates which can be used include stannous acetate, stannous propionate, stannous oxalate, stannous butyrate, stannous tartrate, stannous valerate, stannous octanoate, stannous stearate, stannous oleate. Of these materials, the preferred catalysts are stannous acetate, stannous octoate, stannous stearate and stannous oleate.

The stannous alkoxide compounds which are used are the divalent tin salts of a saturated or unsaturated, branched chain or straight chain alcohol containing from 1 to 18 carbon atoms, preferably 3 to 12 carbon atoms. Representative examples of suitable stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, and o, m, and p-stannous cresoxides, and the like.

The concentration of mono-carboxylic acid initiator in the compositions of this invention can be from 10 to 50 weight percent, preferably from 20 to 40 weight percent, based on the combined weight of said monocarboxylic acid, polyepoxide and stannous acylate or stannous alkoxide catalyst.

The concentration of polyepoxide in the composition can be from 40 to 90 weight percent, preferably 60 to 80 weight percent, based on the combined weight of said polyepoxide, mono-carboxylic acid initiator and stannous acylate or stannous alkoxide catalyst.

The concentration of stannous acylate or stannous alkoxide catalyst in the composition can vary from 0.1 to 10 weight percent, preferably 0.5 to 2 weight percent of the combined weight of said stannous acylate or stannous alkoxide, polyepoxide, and monocarboxylic acid initiator.

The ratio of free carboxyl groups in the initiator to total epoxy groups in the polyepoxide can vary from 0.05:1 to 0.4:1; preferably this ratio is from 0.15:1 to 0.33:1. Under these conditions and concentrations the compositions cure rapidly and efficiently with the use of less energy than heretofore considered possible.

The high solids curable compositions can also contain a minor amount of solvent, to assist in viscosity control. In such instances any of the known organic solvents can be used that are conventionally used in the coating and ink fields.

In addition, other crosslinkers can also be present in small amounts, such as urea-formaldehyde resins or melamine-formaldehyde resins. In such instances one can include a known catalyst for this crosslinking reaction.

It has also been found that mixtures of the preferred polyepoxides can be used. In addition it was observed that the bis-glycidyl ether of bisphenol-A by itself did not cure to a dry film at temperatures below 300° F. in the presence of our mono-carboxylic acid initiator and stannous salt catalyst combination. However, when it was in admixture with our defined preferred aliphatic polyepoxides cure was readily achieved. It was also observed that cure was not achieved when the initiator was used in the absence of the stannous salt catalyst or the stannous salt catalyst was used without the mono-carboxylic acid initiator regardless of which epoxide was used.

Ethyl acid phthalate was found to be a particularly effective initiator for the polymerization of epoxidized oils and cycloaliphatic epoxides in the presence of stannous octoate. Coatings containing 70 to 90 percent solids by weight were typical. These coatings cured rapidly at temperatures of 200° F. to 250° F. Combinations of epoxidized linseed oil, cycloaliphatic epoxides, ethyl acid phthalate, and stannous octoate afforded coatings with a good balance of hardness, flexibility, and solvent resistance. Combinations of diglycidyl ethers of bisphenol A, ethyl acid phthalate, and stannous octanoate did not cure well at temperatures below 300° F. However, when used in combination with epoxidized linseed oil or cycloaliphatic epoxides, the glycidyl ether of bisphenol A did afford coatings with low energy cure responses.

When the monofunctional carboxylic acid is a phthalate half-acid, the initiation of epoxide homopolymerization occurs at about 200° F. as opposed to 300° F. to 400° F. when the acid is absent. By utilizing this technique, coatings can now be designed which minimize pollution and conserve energy.

In the absence of any stannous salt catalyst in the high solids compositions of this invention, the pot-life of the composition can be several days. The presence of the catalyst tends to hasten the cure reaction, even at ambient temperature, and generally reduces the pot-life to a few hours. It was observed, however, that the presence of a tertiary amine in an amount in excess of the equivalent amount of catalyst present for the reaction, served to extend the pot-life of the compositions of this invention.

In view of the pot-lives of the compositions, it is preferred to prepare the desired blend of monocarboxylic acid initiator, polyepoxide, and stannous acylate or stannous alkoxide catalyst of this invention as it is needed. This is a common and accepted procedure in commercial practice today when reactive components are involved. The blends are produced by any of the known and practical mixing procedures used by the ink and coating compositions industry. These procedures require no further description herein to enable one skilled in the art to produce our novel compositions.

The high solids compositions of this invention can also contain colorants, pigments, dyes, fillers, fungicides, bactericides, flow control additives, antioxidants, UV-absorbing agents or any of the other additives conventionally added to coating and ink compositions, in their usual concentrations.

The coating compositions are applied to a substrate by the known conventional methods. They are then cured by heating at a temperature of about 125° F. to 275° F., preferably from 200° F. to 225° F. for a period of time sufficient to obtain a dry film. Generally, this time will vary from about 1 to 30 minutes, and it is usually from 5 to 20 minutes. The compositions present in a particular coating composition used will control the temperature and time required to obtain an adequate cure and a good film coating and in some instances cure will take place at room temperature.

The coatings compositions of this invention are high solids compositions and they can contain as much as 100 weight percent solids therein. Generally the total solids content of the coatings compositions of this invention range from about 60 to 90 weight percent of the total weight of the composition.

The coatings compositions were evaluated according to the following procedures:

Solvent resistance—This is measured by the resistance of the cured film to attack by acetone. It is reported in the number of rubs or cycles of acetone soaked cheesecloth required to remove one-half of the film from the test area. The test is performed by stroking the film with an acetone soaked cheesecloth until that amount of coating film is removed. The number of cycles required to remove this amount of coating is a measure of the coating solvent resistance. If one of the components of the composition is insoluble in acetone, another solvent must be selected.

Reverse impact resistance—is a measure of coating flexibility. It measures the ability of a given film to resist rupture from a falling weight. A Gardner Impact Tester using an 8 pound dart is used to test the films cast and cured on the steel panel. The dart is raised to a given height in inches and dropped onto the reverse side of a coated metal panel. The inches times pounds, designated inch-pounds, absorbed by the film without rupturing is a measure of the reverse-impact resistance of the film.

Pencil Hardness is a measure of film hardness. The adhesion and cohesive strength of the film also influences pencil hardness. Pencils of known lead hardness are shaped to a cylindrical point with a flat tip. The pencils are manually pushed into the coating surface at a 45° angle. Pencil hardness is recorded as the hardest pencil which does not cut the coating.

Pencil hardness after water immersion—Coated panels are immersed in a circulating, distilled water-bath for 16 hours at 52° C. The panels are then placed in a shallow pan filled with warm tap water and tested for the retention of pencil hardness while immersed. This test is a measure of water sensitivity.

Crosshatch adhesion—The coated substrate is cut with a series of parallel razor blades in a crosshatch pattern. Adhesion of the coating to the substrate is tested by firmly applying high tack tape and pulling the tape off with a quick jerk. The percent coating remaining within the crosshatch pattern is recorded as the crosshatch adhesion.

Pasteurization is a test designed to measure the resistance of a film to a simulated pasteurization cycle. The coated substrate is immersed in deionized, distilled water maintained at 76.7° C. for 45 minutes. The coated substrate is quickly dried with a dry cloth or tissue and observed for blush or film whitening. Then the crosshatch test is used to measure the "wet" adhesion of the coating.

In this application, the following definitions describe the particular compounds that are used in the examples:

Silicone Surfactant I is

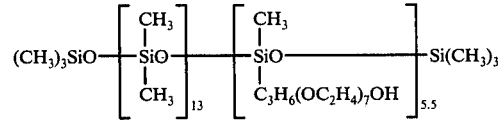

Epoxide A is 3,4-epoxycyclohexylmethyl-3,4-epoxycyclohexene carboxylate. Epoxide B is bis(3,4-epoxycyclohexylmethyl)adipate. Industrial ethyl alcohol is a plant mixture containing 85.8 parts ethyl alcohol, 4.3 parts methanol, 9 parts isopropanol, and 0.9 part methyl isobutyl ketone. Epoxide C is bis(3,4-epoxy-5-methylcyclohexyl methyl)adipate. Epoxide D is a 2,2-bis[p-(2,3-epoxypropoxy)phenyl]propane derivative. Polyol A is a polycaprolactone triol having an average molecular weight of 300 and an average hydroxyl number of 560. Polyol B is a polycaprolactone triol having an average molecular weight of 540 and an average hydroxyl number of 310.

The following examples further serve to define this invention.

EXAMPLE 1

A reaction flask equipped with a stirrer, thermometer, and nitrogen inlet tube was charged with 93.5 grams of 2-butoxyethanol and 21 grams of phthalic anhydride. The mixture was heated under nitrogen for 30 minutes at 130° C. The product, which is the butoxyethyl monoester of phthalic acid, was a light yellow liquid which crystallized upon standing at room temperature after about one week.

A coating composition was formulated by mixing 10.5 grams of the above liquid monocarboxylic acid initiator, before it had crystallized, with 18 grams of Epoxide B, 0.15 gram of stannous octanoate, 0.13 gram of Silicone Surfactant I, and 2 grams of butyl acetate. Films were cast on steel panels with a number 40 wire-wound rod at 94 weight percent solids and cured for 30 minutes at 210° F. The cured film was solvent resistant (100 acetone rubs), flexible (>320 inch-pounds reverse impact), glossy, and had a pencil hardness of HB.

EXAMPLE 2

Following a procedure similar to that described in Example 1, a mixture of 81.4 grams of n-butanol and 98 grams of maleic anhydride was reacted for 10 minutes at 100° C. The product was liquid butyl acid maleate and had an acid number of 334.3 mg. KOH/gm.

A coating composition was formulated by mixing 1 gram of the above liquid monocarboxylic acid initiator with 21.9 grams of Epoxide C, 0.15 gram of stannous octanoate, 0.10 gram of Silicone Surfactant I, and 2 grams of butyl acetate. Films were cast on steel panels with a number 40 wire-wound rod and cured for 30 minutes at 210° F. and 20 minutes at 180° F. The film cured at 180° F. was soft (pencil hardness of B) and lightly crosslinked (26 acetone rubs). The film cured at 210° F., was solvent resistant (>100 acetone rubs), and hard (F pencil hardness).

EXAMPLE 3

A coating composition was formulated by mixing 2.8 grams of the Example 2 butyl acid maleate monocarboxylic initiator with 17.2 grams of Epoxide C, 0.1 gram of stannous octanoate, 0.1 gram of Silicone Surfactant I and 2 grams of butyl acetate. Films were prepared as described in Example 2 and cured for 30 minutes at 210° F. The film was very tacky and passed 3 acetone rubs.

EXAMPLE 4

Following a procedure similar to that described in Example 1, a mixture of 258.1 grams of phthalic anhydride and 141.9 grams of n-butyl alcohol was reacted for 30 minutes at 130° F. The product had an acid number of 243 mg. KOH/gm. and crystallized on standing at room temperature for a day. The product, butyl acid phthalate was diluted to 70 weight percent solids with a 1/1 mixture of butyl acetate and ethyl acetate and heated to 50° to 60° C. to afford a liquid solution.

A coating composition was formulated by mixing 8.85 grams of the above solution of the butyl acid phthalate initiator diluted to 70 weight percent solids with 13.8 grams of Epoxide C, 0.1 gram of stannous octanoate, and 0.1 gram of Silicone Surfactant I. Films were prepared as described in Example 2 and cured for 30 minutes at 210° F. The film was soft (B pencil hardness), lightly crosslinked (32 acetone rubs), and glossy.

EXAMPLE 5

Following a procedure similar to that described in Example 1, a mixture of 129.05 grams of phthalic anhydride and 70.95 grams of 1-methyl propanol was heated at 130° C. for 30 minutes in the presence of 42.5 grams of n-butyl acetate. The mixture was cooled to 80° C. and placed in a wide mouth glass container. The product contained was 1-methylpropyl acid phthalate and the mixture had an acid number of 133 mg. KOH/gm.

A coating composition was formulated by mixing 6.25 grams of the above 1-methylpropyl acid phthalate solution as initiator with 15 grams of Epoxide C, 0.1 gram of stannous octanoate, and 2 grams of n-butyl alcohol. Films were cast according to the procedure described in Example 2 and cured for 30 minutes at 210° F. The cured film had 32 acetone rubs, a pencil hardness of B, and less than 5 inch-pounds reverse impact resistance.

EXAMPLE 6

A coating composition was formulated by mixing 9.4 grams of the initiator solution prepared in Example 5 with 10.6 grams of Epoxide B, 0.1 gram of stannous octanoate, and 2 grams of n-butyl acetate. Films were prepared as described in Example 2 and cured for 30 minutes at 210° F. The cured films were acetone resistant (>100 acetone rubs), hard (H pencil hardness), and glossy.

EXAMPLE 7

A reaction flask equipped with a stirrer, thermometer, and nitrogen inlet tube was charged with 100 grams of absolute ethyl alcohol and 296 grams of phthalic anhydride. The mixture was reacted under nitrogen for 30 minutes at 140° C. Ethyl acid phthalate was obtained as a low viscosity liquid with an acid number of 280.5 and a Brookfield viscosity of 645 centipoises resulted.

Coating compositions were produced by blending the above initiator with Epoxide B at different epoxide to carboxyl ratios. Each formulation contained 0.05 gram of Silicone Surfactant I and 1 gram of n-butyl acetate. Films were prepared according to the procedure described in Example 2 and cured for 20 minutes at 200° F.

| Run | a | b | c | d | e | f | g | h |
|---|---|---|---|---|---|---|---|---|
| Initiator, gms | 10 | 10 | 10 | 10 | 10 | 10 | 10 | 0 |
| Epoxide B, gms | 9.5 | 19 | 23.7 | 31.6 | 38 | 47.6 | 31.6 | 100 |
| Stannous octanoate, gms | 0.2 | 0.29 | 0.34 | 0.42 | 0.48 | 0.58 | 0 | 1 |
| Equiv. Ratio COOH:oxirane | 1:1 | 0.5:1 | 0.4:1 | 0.33:1 | 0.25:1 | 0.2:1 | 0.33:1 | — |

| Cured Film Properties | Acetone Rubs | Comments |
|---|---|---|
| Run a | 3 | tacky film |
| b | 12 | tacky film |
| c | 65 | sl. tacky film, pencil hardness of H |
| d | 100 | tack free film, pencil hardness of H |
| e | 80 | tack free film, pencil hardness of F |
| f | 18 | tacky film |
| g | 1 | no cure |
| h | 1 | no cure |

Runs g and h are control runs showing no cure at 200° F. when either the stannous salt or the monocarboxylic acid initiator is omitted.

EXAMPLE 8

Following a procedure similar to that described in Example 1, a mixture of 296 grams of phthalic anhydride and 100 grams of industrial alcohol was heated at 140° C. for 30 minutes to produce a liquid ethyl acid phthalate initiator with an acid number of 284 mg. KOH/gm.

A coating composition was produced by blending 3 grams of the above product with 8.7 grams of Epoxide B, 0.11 grams of stannous octanoate and 0.1 gram of Silicone Surfactant I. Films were prepared according to the procedure described in Example 2 and cured for 21 days at room temperature. The room temperature cured film had a pencil hardness of 2B, passed 25 acetone rubs, and passed 25 inch-pounds of reverse impact resistance.

EXAMPLE 9

A pigmented mixture was produced by charging a ball mill with 100 grams of the ethyl acid phthalate initiator of Example 8, 226 grams of titanium dioxide, 48.2 grams of 2-ethoxyethyl acetate, and 5 grams of stannous octanoate and rolling the mixture overnight to effect dispersion of the pigment. A pigment containing coating composition was produced by blending 95 grams of the above pigmented mixture with 88 grams of Epoxide B and 0.63 gram of Silicone Surfactant I. The coating composition had a Brookfield viscosity of 362 seconds and a Zahn No. 2 cup viscosity of 62 seconds.

Films were prepared according to the procedure described in Example 2 and cured for 20 minutes at 150° F., 180° F., and 210° F. The cured film had respective pencil hardnesses of >4B, 2B, and F and acetone resistances of 5, 24, and 25.

EXAMPLE 10

Coating compositions were produced by blending the product described in Run 9 of Example 7 with epoxidized linseed oil. Films were prepared according to the procedure described in Example 2 and cured for 20 minutes at 225° F.

| Run | a | b | c | d | e | f |
|---|---|---|---|---|---|---|
| Example 7, Run g Prod., gms. | 20 | 25 | 30 | 35 | 25 | 0 |
| Epoxidized linseed oil, gms. | 80 | 75 | 70 | 65 | 75 | 100 |
| Stannous octanoate, gms. | 1 | 1 | 1 | 1 | 0 | 1 |
| Silicon Surfactant I, gms. | 0.5 | 0.5 | 0.5 | 0.5 | 0.5 | 0.5 |
| 2-Ethoxyethyl acetate, gms. | 15 | 15 | 15 | 15 | 5 | 5 |
| Carboxyl/Epoxide Equivalents | 0.15 | 0.20 | 0.26 | 0.32 | 0.20 | — |
| Cured Film Properties | | | | | | |
| Acetone Rubs | 54 | 100 | 73 | 54 | 1 | 1 |
| Pencil Hardness | F | H | H | F | NT* | NT |
| Reverse Impact, in-lbs. | 300 | 320 | 320 | 320 | NT | NT |

*NT denotes film not tested because film was not sufficiently cured.

A carboxyl to epoxide equivalents ratio of 0.2 to 0.25 gave the best combination of film performance properties. A carboxyl to epoxide equivalent ratio of 0.2 to 0.25 equates to 5 to 4 epoxide groups consumed for each carboxyl group. The results illustrates the synergism of mixtures of stannous octanoate and ethyl acid phthalate for achieving cured films.

EXAMPLE 11

Coating compositions were produced by blending the initiator produced in the first paragraph of Example 8 with mixtures of epoxidized linseed oil and Epoxide A. Films were prepared according to the procedure described in Example 2 and cured for 20 minutes at 225° F.

| Run | a | b | c | d | e |
|---|---|---|---|---|---|
| Initiator, Ex.8, gms. | 27.5 | 27.5 | 27.5 | 27.5 | 27.5 |
| Epoxidized linseed oil, gms. | 25 | 36.25 | 46.5 | 60 | 47.5 |
| Epoxide A, gms. | 47.5 | 36.25 | 25 | 12.5 | 25 |
| Stannous octanoate, gms. | 1 | 1 | 1 | 1 | 0 |
| Silicon Surfactant I, gms | 0.5 | 0.5 | 0.5 | 0.5 | 0.5 |
| 2-Ethoxyethyl acetate, gms. | 15 | 15 | 15 | 15 | 5 |
| Carboxyl/Epoxide Equivalent Ratio | 0.2 | 0.2 | 0.21 | 0.21 | 0.21 |
| Cured Film Properties | | | | | |
| Acetone Rubs, cycles | 100 | 100 | 100 | 35 | 1 |
| Reverse impact resistance, inch-pounds | 5 | 5 | 320 | 320 | NT** |
| Pencil hardness | 2H | 2H | 2H | H | NT |
| Pencil hardness after water immersion* | 3H/2H | 3H/2H | 2H/F | F/B | NT |

*Film was cured for 20 minutes at 250° F., then immersed for 16 hours at 52° C.
**NT denotes film was not treated because film was not sufficiently cured.

At constant monocarboxylic acid content (ethyl phthalate), Epoxide A functions as a hardening component and epoxidized linseed oil functions as a flexibilizing component. No cure was obtained in the absence of stannous octanoate.

EXAMPLE 12

Coating compositions were produced by blending the initiator produced in the first paragraph of Example 8 with mixtures of epoxidized soybean oil and Epoxide A. Films were prepared according to the procedure described in Example 2 and cured for 20 minutes at 225° F.

| Run | a | b | c | d |
|---|---|---|---|---|
| Initiator, Ex. 8, gms. | 27.5 | 27.5 | 27.5 | 27.5 |
| Epoxidized soybean oil, gms. | 25 | 36.25 | 47.5 | 60 |
| Epoxide A, gms. | 47.5 | 36.25 | 25 | 12.5 |
| Stannous octanoate, gms. | 1 | 1 | 1 | 1 |
| Silicone surfactant I, gms. | 0.5 | 0.5 | 0.5 | 0.5 |
| 2-Ethoxyethyl acetate, gms. | 15 | 15 | 15 | 15 |
| Carboxyl/Epoxide Equivalent Ratio | 0.21 | 0.23 | 0.24 | 0.27 |
| Cured Film Properties | | | | |
| Acetone rubs, cycles | 70 | 40 | 52 | 35 |
| Pencil hardness | 2H | F | F | B |

EXAMPLE 13

Coating compositions were prepared by blending the initiator produced in the first paragraph of Example 8 with epoxidized soybean oil. Films were prepared according to the procedure described in Example 2 and cured for 20 minutes at 225° F.

| Run | a | b | c | d |
|---|---|---|---|---|
| Initiator, Ex. 8, gms. | 20 | 25 | 30 | 35 |
| Epoxidized soybean oil, gms. | 80 | 75 | 70 | 65 |
| Stannous octanoate, gms. | 1 | 1 | 1 | 1 |
| Silicone Surfactant I, gms. | 0.5 | 0.5 | 0.5 | 0.5 |
| 2-Ethoxyethyl acetate, gms. | 15 | 15 | 15 | 15 |
| Carboxyl/Epoxide Equivalent Ratio | 0.20 | 0.26 | 0.34 | 0.42 |
| Cured Film Properties | | | | |
| Acetone Rubs, cycles | 20 | 45 | 26 | 14 |
| Pencil hardness | 3B | 2B | 2B | 3B |

EXAMPLE 14

Coating compositions were produced by blending the initiator produced in the first paragraph of Example 8 with mixtures of epoxidized linseed oil and Epoxide A. Films were prepared according to the procedure described in Example 2 and cured for 20 minutes at 225° F.

| Run | a | b | c | d | e | f | g |
|---|---|---|---|---|---|---|---|
| Initiator, Ex. 8, gms. | 20 | 25 | 30 | 35 | 40 | 50 | 25 |
| Epoxidized linseed oil, gms | 53.5 | 50 | 46.5 | 43.5 | 40 | 33.5 | 50 |
| Epoxide A, gms. | 26.5 | 25 | 23.5 | 21.5 | 20 | 16.5 | 25 |
| Stannous octanoate, gms. | 1 | 1 | 1 | 1 | 1 | 1 | 0 |
| Silicone Surfactant I, gms. | 0.5 | 0.5 | 0.5 | 0.5 | 0.5 | 0.5 | 0.5 |
| 2-Ethoxyethyl acetate, gms. | 15 | 15 | 15 | 15 | 15 | 15 | 5 |
| Carboxyl/Epoxide Equivalents | 0.14 | 0.19 | 0.24 | 0.30 | 0.37 | 0.56 | — |
| Film Properties | | | | | | | |
| Acetone rubs, cycles | 50 | 100 | 100 | 100 | 59 | 25 | 1 |
| Reverse impact, inch-pounds | 320 | 200 | 200 | 50 | 320 | 320 | NT* |
| Pencil hardness | B | 2H | 2H | H | F | B | NT |

*NT denotes film was not tested because film was not sufficiently cured due to absence of stannous octanoate.

The results indicate that a carboxyl to epoxide equivalent ratio of about 0.15 to 0.55 is preferred and 0.20 to 0.30 is most preferred for this system when cured at 225° F.

EXAMPLE 15

Coating compositions were produced by blending the initiator produced in the first paragraph of Example 8 with a mixture of epoxidized linseed oil and Epoxide D. Films were prepared according to the procedure described in Example 2 and cured for 20 minutes at 220° F.

| Run | a | b | c | d | e | f | g |
|---|---|---|---|---|---|---|---|
| Initiator, Ex.8, gms. | 25 | 25 | 24.5 | 24.5 | 24 | 24 | 24.5 |
| Epoxidized linseed oil, gms. | 50 | 37.5 | 25 | 17 | 7.5 | 0 | 25 |
| Epoxide D, gms. | 25 | 37.5 | 50.5 | 56.5 | 68.5 | 76 | 50.5 |
| Stannous octanoate, gms. | 1 | 1 | 1 | 1 | 1 | 1 | 0 |
| 2-Ethoxyethyl acetate, gms. | 15 | 15 | 20 | 20 | 20 | 20 | 5 |
| Carboxyl/Epoxide Equivalent Ratio | 0.3 | 0.3 | 0.3 | 0.3 | 0.3 | 0.3 | — |
| Cured Film Properties | | | | | | | |
| Acetone rubs, cycles | 100 | 100 | 100 | 100 | 70 | 3 | 1 |
| Reverse Impact, inch-pounds | 320 | 320 | 320 | 300 | <5 | NT* | NT |
| Pencil Hardness | F | F | F | F | 2B | NT | NT |
| Pasteurization Resistance Blush Resistance, rating | NE** | NE | NE | NE | marginal | poor | NT |
| Wet Adhesion, % pass | 90 | 95 | 100 | 100 | NT | NT | NT |

*NT denotes film was not cured. In Run g. the composition was not cured because stannous octanoate was no included; in Run f. Epoxide D was used, which is not an aliphatic epoxide
**NE = No effect on film or perfect resistance Compositions of epoxidized linseed oil, Epoxide D, and Example 8 initiator films with good performance when cured at 220° F. Seventeen to 25 percent epoxidized linseed oil with Epoxide D afforded film performance acceptable for use in can coatings.

EXAMPLE 16

A pigmented mixture was produced by charging a ball mill with 80 grams of epoxidized linseed oil, 40 grams of Epoxide D, 50 grams of iron oxide, 25 grams of aluminum silicate, 177.5 grams of barium sulfate, 5 grams of stannous octoate, and 67.5 grams of 2-ethoxyethyl acetate and rolling the mixture for 48 hours to effect dispersion of the pigments. A pigmented coating composition was produced by blending 222.5 grams of the above pigmented mixture with 27.5 grams of the initiator produced in Example 8. The pigmented coating composition had a Brookfield viscosity at 25° C. of 280 centipoises and a Zahn No. 2 cup viscosity of 44 seconds.

Films were prepared according to the procedure described in Example 2 and cured for 20 minutes at 250° F. The cured films were hard (pencil hardness of 2H), solvent resistance (100 acetone rubs passed), and adherant (passed crosshatch adhesion tests).

EXAMPLE 17

A pigmented mixture was prepared by charging a ball mill with 105 grams of epoxidized linseed oil, 52.5 grams of Epoxide A, 210 grams of titanium dioxide, 5 grams of stannous octoate, and 75 grams of 2-ethoxyethyl acetate solvent and rolling the mixture for 48 hours to effect dispersion of the titanium dioxide pigment. A pigmented coating composition was produced by blending 223.75 grams of the above pigmented mixture with 26.25 grams of the initiator produced in Example 8. The pigmented coating composition had a Brookfield viscosity of 144 centipoise and a Zahn No. 2 cup viscosity of 30 seconds at 25° C.

Films were prepared according to the procedure described in Example 2 and cured for 20 minutes at 220° C. The cured films had a pencil hardness of B, passed 100 acetone rubs, were glossy, and passed 320 inch-pounds of reverse impact.

EXAMPLE 18

A coating composition was prepared by blending 9.8 grams of linoleic acid with 10.2 grams of Epoxide A, 0.2 grams of stannous octoate, and 2 grams of 2-ethoxyethyl acetate solvent. The coating composition has a solids content of 91 weight percent solids.

Films were prepared according to the procedure described in Example 2 and cured for 20 minutes at 220° F. The cured films were flexible (>320 inch-pounds reverse impact resistance), solvent resistant (100 acetone rubs), glossy, and had a pencil hardness of 2B.

EXAMPLE 19

Following a procedure similar to that described in Example 1, a mixture of 317 grams of a blend of the adduct of linear alcohols (having 11 to 15 carbon atoms) reacted with about 7 molecules of ethylene oxide and 83 grams of phthalic anhydride were heated for 30 minutes at 140° C. The monocarboxylic acid initiator produced had an acid number of 62 mg. KOH/gm.

A coating composition was prepared by blending 10 grams of the above initiator with 5 grams of Epoxide A, 0.15 gram of stannous octoate, and 0.1 gram of Silicone Surfactant I. The coating composition contains 100 weight percent solids.

Films were prepared according to the procedure described in Example 2 and cured for 20 minutes at 220° F. The cured films achieved a pencil hardness of greater than 4B, passed 2 acetone rubs, and had a reverse impact resistance of more than 320 inch-pounds.

EXAMPLE 20

A coating composition was prepared by blending 15 grams of the epoxidized ester of tall oily fatty acids and pentaerythritol, 5 grams of the initiator produced in Example 8, 0.3 gram of stannous octoate, 0.1 gram of Silicone Surfactant I, and 2 grams of 2-ethoxyethyl acetate. The coating composition contained 91 weight percent solids.

Films were prepared according to the procedure described in Example 2 and cured for 20 minutes at 220° F. The cured films achieved a pencil hardness of 4B, passed 45 acetone rubs, and had a reverse impact resistance of more than 320 inch-pounds.

EXAMPLE 21

A coating composition was prepared by blending 14 grams of methyl epoxylinoleate with 6 grams of the initiator produced in Example 8, 0.2 gram of stannous octoate, and 0.1 gram of Silicone Surfactant I. The coating was 100 percent solids and had a Brookfield viscosity of about 300 centipoises at 25° C.

Films were prepared according to the procedure described in Example 2 and cured for 20 minutes at 250° F. The cured film had a pencil hardness of about 4B, 2 acetone rubs, and more than 320 inch-pounds of reverse impact resistance.

EXAMPLE 22

A coating composition was prepared by blending 5 grams of 2-acryloxyethyl acid phthalate as initiator, 12.1 grams of Epoxide B, 0.17 gram of stannous octoate, 0.1 gram of Silicone Surfactant I, and 1.0 gram of butyl acetate. The coating composition contained 95 weight percent solids.

Films were prepared according to the procedure described in Example 2 and cured for 20 minutes at 200° F. The cured films were flexible (>320 inch-pounds reverse impact resistance), had fair solvent resistance (65 acetone rubs), and had a pencil hardness of H.

In some instances, a partial ester having an average of one free carboxyl group can be produced by the reaction of a polycarboxylic acid or its anhydride with a polyhydroxyl compound such as 3-hydroxy-2,2-dimethylpropyl 3-hydroxy-2,2-dimethylpropionate, ethylene glycol, polycaprolactone polyols, polyalkylene glycols, trimethylol propane, pentaerythritol or tetraethylene glycol. However, these are not monocarboxylic acid compounds as defined by our general formula. Nevertheless, they can be used as initiators in conjunction with the stannous salts to produce high solids coating compositions.

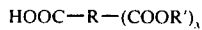

What we claim is:

1. A high solids liquid composition comprising (I) from 40 to 90 weight percent of a polyepoxide, (II) from 10 to 60 weight percent of a monocarboxylic acid initiator having a $pK_a$ value of less than 4 and (III) from 0.1 to 10 weight percent of a stannous salt catalyst; said percentages based on the combined weights of (I), (II) and (III); wherein said component (II) is a compound of the general formula:

$$HOOC-R-(COOR')_x$$

wherein
 $x$ is an integer having a value of from 0 to 2;
 R is
  (i) phenyl, or
  (ii) naphthyl, or
  (iii) —CH=CH— when $x$ is 1;
 R' is
  (i) an alkyl group having from 1 to 8 carbon atoms, or
  (ii) a —$C_nH_{2n}(OC_nH_{2n})_mOC_pH_{2p+1}$ group or
  (iii) a —$C_nH_{2n}OOCCX$=$CH_2$ group;
 $n$ is an integer having a value of 2 to 4;
 $m$ is an integer having a value of 0 to 7;
 $p$ is an integer having a value of 1 to 15; and
 X is hydrogen or methyl;
and wherein said component (III) is a stannous acylate of a mono- or dicarboxylic acid having from 1 to 54 carbon atoms or a stannous alkoxide having from 1 to 18 carbon atoms in the alkoxide group; and wherein the equivalent ratio of free carboxyl groups in component (II) to total epoxy groups in component (I) is from 0.05:1 to 0.4:1.

2. A composition as claimed in claim 1, wherein component (II) is a monocarboxylic acid and $x$ is 0.

3. A composition as claimed in claim 1, wherein component (II) is a monocarboxyl partial ester of a polycarboxylic acid and $x$ is 1 or 2.

4. A composition as claimed in claim 1, wherein component (II) is ethyl acid phthalate and component (III) is stannous octanoate.

5. A composition as claimed in claim 1, wherein component (II) is the butoxyethyl monoester of phthalic acid and component (III) is stannous octanoate.

6. A composition as claimed in claim 1, wherein component (II) is butyl acid maleate and component (III) is stannous octanoate.

7. A composition as claimed in claim 1, wherein component (II) is 1-methylpropyl acid phthalate and component (III) is stannous octanoate.

8. A composition as claimed in claim 1, wherein component (II) is the monoester of phthalic anhydride and the adduct of the reaction of about 7 moles of ethylene oxide with a mixture of $C_{11}$ to $C_{15}$ linear alcohols and component (III) is stannous octanoate.

9. A composition as claimed in claim 1, wherein component (II) is 2-acryloxyethyl acid phthalate and component (III) is stannous octanoate.

10. A composition as claimed in claim 1, wherein component (I) is a mixture of epoxides.

11. A composition as claimed in claim 1, wherein a colorant is additionally present.

12. A composition as claimed in claim 1, wherein component (I) is 3,4-epoxycyclohexylmethyl-3,4-epoxycyclohexane carboxylate.

13. A composition as claimed in claim 1, wherein component (I) is bis(3,4-epoxycyclohexylmethyl) adipate.

14. A composition as claimed in claim 1, wherein component (I) is bis(3,4-epoxy-5-methylcyclohexylmethyl)adipate.

15. A composition as claimed in claim 1, wherein component (I) is epoxidized linseed oil.

16. A composition as claimed in claim 1, wherein component (I) is epoxidized soybean oil.

17. A composition as claimed in claim 1, wherein component (I) is a mixture of epoxidized linseed oil and the glycidyl ether of bisphenol-A.

18. A composition as claimed in claim 1, wherein component (I) is a mixture of epoxidized linseed oil and 3,4-epoxycyclohexylmethyl-3,4-epoxycyclohexane carboxylate.

19. A composition as claimed in claim 1 in the form of a cured, dry film on the surface of a substrate.